United States Patent
Hoffman et al.

[15] 3,655,263
[45] Apr. 11, 1972

[54] LIGHT DIFFUSION DEVICE

[72] Inventors: Mark Hoffman; Claude Alan Lindquist, Jr., both of 253 E. 42nd Street, New York, N.Y. 10017

[22] Filed: Apr. 20, 1970

[21] Appl. No.: 30,272

[52] U.S. Cl..............................350/126, 117/33.3, 117/76 F, 117/138.8 F, 117/138.8 UA, 117/138.8 G, 117/161 K, 161/3.5
[51] Int. Cl. ..............................................G03b 21/60
[58] Field of Search ................117/138.8 F, 138.8 A, 33.5 T, 117/33.5 R, 33.3, 76 F, 73, 159; 350/188, 126; 161/3.5

[56] References Cited

UNITED STATES PATENTS

| | | |
|---|---|---|
| 3,351,409 | 11/1967 | McGuire............................117/33.3 X |
| 2,878,136 | 3/1959 | Gustin............................117/33.5 R X |
| 2,878,137 | 3/1959 | Butler et al.....................117/33.5 R X |
| 2,362,980 | 11/1944 | Ball.....................................117/15 X |
| 2,892,747 | 6/1959 | Dye........................................161/214 |
| 3,491,237 | 1/1970 | Tillett....................................350/188 |

Primary Examiner—William D. Martin
Assistant Examiner—Ralph Husack
Attorney—Connolly and Hutz

[57] ABSTRACT

A light diffusion device comprising a transparent resin film having a coating adhered to one surface thereof and comprising the solid contents of a resin lacquer composition containing particulated alumina dispersed therein. A preferred embodiment comprises the use of a saturated polyester resin, both for said film and said lacquer.

6 Claims, No Drawings

LIGHT DIFFUSION DEVICE

BACKGROUND OF THE INVENTION

The present invention relates to a device or medium for diffusing light. Such diffusers may be used for lighting of all kinds but are of particular importance in the photographic and other reprographic fields. The diffusers of the instant invention are admirably suited for rear projection screens for a number of reasons. For example, the projected light is sufficiently diffused to avoid "hot spot", the projected colors are lifelike, i.e., are not significantly modified by the screen, the brightness of the image on the screen viewed at angles other than 0° is excellent as compared to commercially available rear projection screens and the projected image is of non-granular appearance. Although a number of prior art screens have offered some of the above advantages, none have embodied all of them.

SUMMARY OF THE INVENTION

The diffusion device of the present invention comprises a transparent resin film having front and rear surfaces and a relatively thin coating adhered to one of said surfaces and comprising the solids content of a resin lacquer composition containing dispersed therein particulated alumina having an average particle diameter ranging from about 0.25 to 40 microns, the ratio by weight of said alumina to said resin in said lacquer being from about 0.5:1 to 3:1 and the percentage difference of the indices of refractions of the resin of said film and of said alumina being from 1 to 25 percent. A modified form of the present invention includes a protective coating of a clear, transparent resin applied to the surface of said lacquer coating. Although the diffusion device of the present invention may be used for a plurality of purposes wherein light diffusion is of importance, it is particularly adapted for rear projection screens, i.e., screens wherein an image is projected on one side by a projection device such as a movie projector and the resulting image is viewed from the other side. The instant diffusers are also suitable as front projection screens.

DETAILED DESCRIPTION OF THE INVENTION

The transparent resin film component of the diffuser of the instant invention may be produced from a variety of resins. It is only necessary that the resin be a transparent film forming resin having an index of refraction of a value such that the percentage difference of the indices of refractions of the resin of the film and of the alumina component is from 1 to 25 percent, preferably about 5 to about 10 percent. Index of refraction as referred to herein is the value obtained employing A.S.T.M. Test Method D542. The following is a tabulation of exemplary resins possessing the transparent film-forming capacity together with an index of refraction suitable for establishing a value within the aforesaid percentage difference range, alumina having a refractive index of 1.764:

| | |
|---|---|
| Polymethylmethacrylate | 1.48–1.50 |
| Cellulose acetate sheet | 1.49–1.50 |
| Cellulose acetate butyrate sheet | 1.586 |
| Phenoxy resin (bisphenol A-epichlorohydrin reaction product) | 1.5978 |
| Cast phenolic (phenol-formaldehyde reaction product) | 1.58–1.66 |
| Cast polyester, rigid | 1.523–1.57 |
| Cast polyester, flexible | 1.537–1.55 |
| Polystyrene | 1.59–1.60 |
| Mylar (polyethylene terephthalate) | 1.64–1.67 |

Of the aforesaid typical transparent resins, the preferred film component of the instant invention is based on a saturated polyester resin, i.e., the product of reaction of a dihydric alcohol and a dibasic acid under controlled conditions wherein water is evolved and chain molecules having terminal hydroxyl or carboxyl groups result. A particularly preferred polyester resin comprises a polymerized linear ester of terephthalic acid and ethylene glycol such as described in U.S. Pat. No. 2,465,319.

The resin of the lacquer coating component of the instant invention may comprise the same resin as that employed in the resin film component or another resin. It is only necessary that it act as a binder for the alumina thereof and adhere to the resin film surface. Preferably, it comprises a saturated polyester resin and this is used in conjunction with a transparent film of a saturated polyester resin. The preferred polyester resin lacquer coating component comprises a linear copolymer of a polymethylene glycol containing from two to six carbon atoms, terephthalic acid, isophthalic acid and at least two acyclic dicarboxylic acids, such as described in U.S. Pat. No. 2,892,747.

The particulated alumina component of the resin lacquer composition used in the preparation of the diffusion device of the instant invention preferably has an average particle diameter from about 0.25 to 40 microns. The particularly preferred diameter ranges from about 1 to about 10 microns. The ratio by weight of the alumina to resin in the lacquer should range from about 0.5:1 to 3:1.

A variety of solvents such as dioxane, tetrahydrofuran, methylene chloride, chloroform, etc., may be employed for the purpose of preparing the lacquer coating compositions used in the preparation of the diffusion devices of the instant invention. The amount employed is determined by the consistency of the lacquer desired for the particular selected coating technique. As shown by the working examples appearing hereinafter, various additives such as conventional curing agents, antistatic agents, etc. may be included in the lacquer.

The resin film of the present invention is preferably self-supporting. In general, a film thickness ranging from about 0.001 to about 0.1 inch thick provides a preferred diffusion device when used in conjunction with an alumina containing coating having a thickness from about 0.0001 to about 0.0009 inch. In the embodiment including a clear, transparent resin protective coating on the alumina containing coating, a protective coating thickness of from about 0.0001 to about 0.0005 inch is preferred.

The following examples illustrate preparation of preferred embodiments of the diffusion device of the instant invention.

EXAMPLE 1

A clear polyester film based on ethylene glycol and terephthalic acid of about 0.003 inch thickness was coated with an alumina containing lacquer dispersion with a knife-over-roll coater and was passed through an oven at a temperature of about 180° C. for a dwell time of about one minute. Following this coating operation, the coated film was allowed to cure at room temperature for approximately 48 hours and was then subjected to an oven cure of 150° F. for about 4 hours.

The composition of the aforesaid alumina containing lacquer comprised the following ingredients:

| | |
|---|---|
| Al$_2$O$_3$ having an average particle diameter of about 5 microns | 2367 g. |
| Lacquer resin (25% solids) | 3672 g. |
| Sodium dioctyl sulfosuccinate | 27 g. |
| Lecithin | 72 g. |
| Polyisocyanate curing agent | 67.5 g. |
| Dioxane | 306 g. |

The foregoing ingredients except for the curing agent and dioxane were placed in a four gallon alumina-fortified pebble mill containing one-half its volume of ¾ inch high density (high alumina) grinding media and the mill was operated for 16 hours. Thereafter, the curing agent and solvent were added and the mill was operated for an additional 30 minutes to provide the alumina containing lacquer.

The aforesaid polyester resin of the alumina containing lacquer was of the type described in U.S. Pat. No. 2,892,747, Example 1 thereof being a preferred embodiment. The polyisocyanate curing agent was of the type described in U.S. Pat. No. 2,683,730, Example II thereof being a preferred embodiment.

EXAMPLE 2

The procedure of Example 1 was repeated employing the following alumina containing lacquer composition:

| | |
|---|---|
| $Al_2O_3$ having an average particle diameter of about 5 microns | 394 g. |
| Lacquer resin (25% solids) | 1224 g. |
| Sodium dioctyl sulfosuccinate | 9 g. |
| Lecithin | 24 g. |
| Polyisocyanate curing agent | 37 g. |
| Dioxane | |

The polyester resin employed corresponded to that described in Example 1. The curing agent corresponded to that described in U.S. Pat. No. 2,855,421, Example 1 illustrating a preferred embodiment.

What is claimed is:

1. A light diffusion device comprising a transparent resin film having front and rear surfaces and a coating of from about 0.0001 to about 0.0009 inch thick adhered to one of said surfaces, said coating consisting essentially of the solid contents of a saturated polyester resin lacquer composition containing dispersed therein particulated alumina having an average particle diameter ranging from about 0.25 to 40 microns, the ratio by weight of said alumina to said resin in said lacquer being from about 0.5:1 to 3:1 and the percentage difference of the indices of refractions of the resin of said film and of said alumina being from 1 to 25 percent.

2. The diffusion device of claim 1 wherein said film is about 0.001 to about 0.1 inch thick.

3. The diffusion device of claim 1 wherein said coating has applied thereto a protective coating of a clear, transparent resin.

4. The diffusion device of claim 1 wherein said percentage difference is from about 5 to about 10 percent.

5. The diffusion device of claim 1 wherein said resin film is a saturated polyester resin.

6. The diffusion device of claim 5 wherein said resin of said film is a polymerized linear ester of terephthalic acid and ethylene glycol and said polyester resin of said lacquer composition is a linear copolymer of a polymethylene glycol containing two to six carbon atoms, terephthalic acid, isophthalic acid and at least two acyclic dicarboxylic acids.

* * * * *

PO-1050
(5/69)

UNITED STATES PATENT OFFICE
CERTIFICATE OF CORRECTION

Patent No. 3,655,263  Dated April 11, 1972

Inventor(s) Mark Hoffman and Claude Alan Lindquist

It is certified that error appears in the above-identified patent and that said Letters Patent are hereby corrected as shown below:

Format page, column 1, after data element "[72]" should read -- Inventors: Mark Hoffman of Phillipsburg, New Jersey; Claude Alan Lindquist of Easton, Pennsylvania --; between data elements [72] and [22] should read -- [73] Assignee: Pfizer Inc., New York, N.Y. --.

Signed and sealed this 29th day of August 1972.

(SEAL)
Attest:

EDWARD M. FLETCHER, JR.
Attesting Officer

ROBERT GOTTSCHALK
Commissioner of Patents